United States Patent
Kalos et al.

(10) Patent No.: US 7,661,012 B2
(45) Date of Patent: Feb. 9, 2010

(54) SPARE DEVICE MANAGEMENT

(75) Inventors: Matthew Joseph Kalos, Tucson, AZ (US); Robert Akira Kubo, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/292,747

(22) Filed: Dec. 1, 2005

(65) Prior Publication Data

US 2007/0220318 A1    Sep. 20, 2007

(51) Int. Cl.
G06F 11/00    (2006.01)

(52) U.S. Cl. ............... 714/2; 714/6; 711/170; 711/114

(58) Field of Classification Search .......... 714/2
See application file for complete search history.

(56) References Cited

U.S. PATENT DOCUMENTS

| | | | |
|---|---|---|---|
| 5,193,171 A * | 3/1993 | Shinmura et al. ............ 711/113 |
| 5,831,914 A * | 11/1998 | Kirihata ................... 365/200 |
| 6,502,204 B2 * | 12/2002 | Achiwa et al. ............... 714/6 |
| 6,658,526 B2 | 12/2003 | Nguyen et al. |
| 6,684,313 B2 | 1/2004 | Voigt et al. |
| 6,836,832 B1 * | 12/2004 | Klinkner ................... 711/170 |
| 6,990,553 B2 | 1/2006 | Nakayama et al. |
| 6,996,752 B2 | 2/2006 | Hetrick et al. |
| 7,069,405 B2 | 6/2006 | Nakamura et al. |
| 7,146,522 B1 * | 12/2006 | Rowe et al. ................... 714/6 |
| 7,216,244 B2 * | 5/2007 | Amano ..................... 713/324 |
| 7,236,915 B2 | 6/2007 | Algieri et al. |
| 7,246,268 B2 * | 7/2007 | Craig et al. .................. 714/42 |
| 2002/0032816 A1 | 3/2002 | Bakke et al. |
| 2002/0184442 A1 | 12/2002 | Veitch et al. |
| 2003/0217305 A1 | 11/2003 | Krehbiel, Jr. et al. |
| 2003/0225970 A1 | 12/2003 | Hashemi |
| 2004/0039891 A1 | 2/2004 | Leung et al. |
| 2004/0177218 A1 | 9/2004 | Meehan et al. |
| 2004/0181707 A1 | 9/2004 | Fujibayashi |
| 2004/0267959 A1 | 12/2004 | Cochran et al. |
| 2005/0021915 A1 | 1/2005 | Lowe et al. |
| 2005/0114593 A1 * | 5/2005 | Cassell et al. .............. 711/114 |
| 2006/0107013 A1 * | 5/2006 | Ripberger .................. 711/170 |
| 2007/0079172 A1 * | 4/2007 | Rowe et al. ................... 714/6 |

\* cited by examiner

*Primary Examiner*—Scott T Baderman
*Assistant Examiner*—Kamini Patel
(74) *Attorney, Agent, or Firm*—Janaki K. Davda; Konrad Raynes & Victor LLP

(57) ABSTRACT

Provided are techniques for spare device management. Candidate devices are sorted into spare coverage groups by type. One or more candidate devices having closest fitting characteristics of a desired type are identified from the spare coverage groups. The identified one or more candidate devices are assigned to be spare devices for the spare coverage group. It is determined whether a desired number of spare devices have been assigned to the spare coverage group. In response to determining that the desired number of spare devices have not been assigned, a spare device having the closest fitting characteristics for every predetermined number of candidate devices having the closest fitting characteristics is assigned, until the desired number of spare devices having the closest fitting characteristics are assigned.

27 Claims, 10 Drawing Sheets

SPARE DEVICE MANAGEMENT

BACKGROUND

1. Field

Embodiments of the invention relate to spare device management.

2. Description of the Related Art

A Redundant Array of Independent Disks (RAID) array may be described as a set of hard disk devices, and the set of hard disk devices provide fault tolerance and performance. A RAID storage system may be described as one that uses RAID arrays. RAID storage systems implement data storage by presenting logical disk devices that are logical entities constructed of multiple hard disk devices. To enhance the availability and reliability characteristics of RAID arrays, RAID technology provides the capability to provide extra hard disk devices to act as "spare" device (i.e., spare hard disk devices) replacements for hard disk device failures. With storage systems that are comprised of multiple RAID arrays, the capability for a single hard disk device to act as a spare device for multiple RAID arrays is known as global sparing.

Some RAID storage systems may define spare devices at the time of RAID array creation. When this type of implementation is used, specific spare devices are defined with a known set of characteristics and attributes. In other RAID storage systems, default rules are created to define the number of spare devices required, and these RAID storage systems automatically select spare devices based on some set of criteria.

In RAID storage systems that use spare assignment optimization techniques, it is not possible to define specific characteristics to ensure adequate performance attributes during failure of hard disk devices and/or repair of hard disk devices.

Although RAID storage systems are useful, there is a need in the art for improved spare device management.

SUMMARY OF EMBODIMENTS OF THE INVENTION

Provided are a method, computer program product, and system for spare device management. Candidate devices are sorted into spare coverage groups by type. One or more candidate devices having closest fitting characteristics of a desired type are identified from the spare coverage groups. The identified one or more candidate devices are assigned to be spare devices for the spare coverage group. It is determined whether a desired number of spare devices have been assigned to the spare coverage group. In response to determining that the desired number of spare devices have not been assigned, a spare device having the closest fitting characteristics for every predetermined number of candidate devices having the closest fitting characteristics is assigned, until the desired number of spare devices having the closest fitting characteristics are assigned.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a spare assignment technique (SAT) that optimizes the management of assignment of spare devices to provide an adequate statistical level of redundancy requiring a minimum number of spare devices by automatically assigning spare devices that provide the optimum redundancy protection characteristics for the storage device population. When the configuration of a device subsystem of a storage server changes (e.g., an event that requires evaluation of the current spare assignments regarding either a new device type or an additional device to be assigned to meet a minimum desired level of redundancy), embodiments respond by automatically assigning the spare devices required. Embodiments minimize the number of devices that are configured at any time to provide the statistical coverage required using the spare assignment technique. Embodiments also free devices that were previously assigned as spare devices when they are no longer required to provide the desired level of redundancy.

Moreover, embodiments enable a user to manually assign spare devices. When spare devices are manually assigned, the spare assignment technique minimizes the number of devices that are configured at any time to provide the statistical coverage required, taking into account any manually assigned spare devices. Embodiments also act to free spare devices that were previously assigned as spare devices when they are no longer required to provide the required level of redundancy, as long as the spare devices were not manually assigned by the user.

The spare devices that are assigned by the spare assignment technique may be referred to as SAT assigned spare devices or SAT spare devices, and the spare devices that are manually assigned may be referred to as manually assigned spare devices or manual spare devices.

Embodiments sort candidate devices by type (e.g., by capacity), divide the sorted devices into spare coverage groups, and then determine which candidate devices from each spare coverage group are to be spare devices. Initially, all available devices are considered to be candidate devices.

Figure 1:
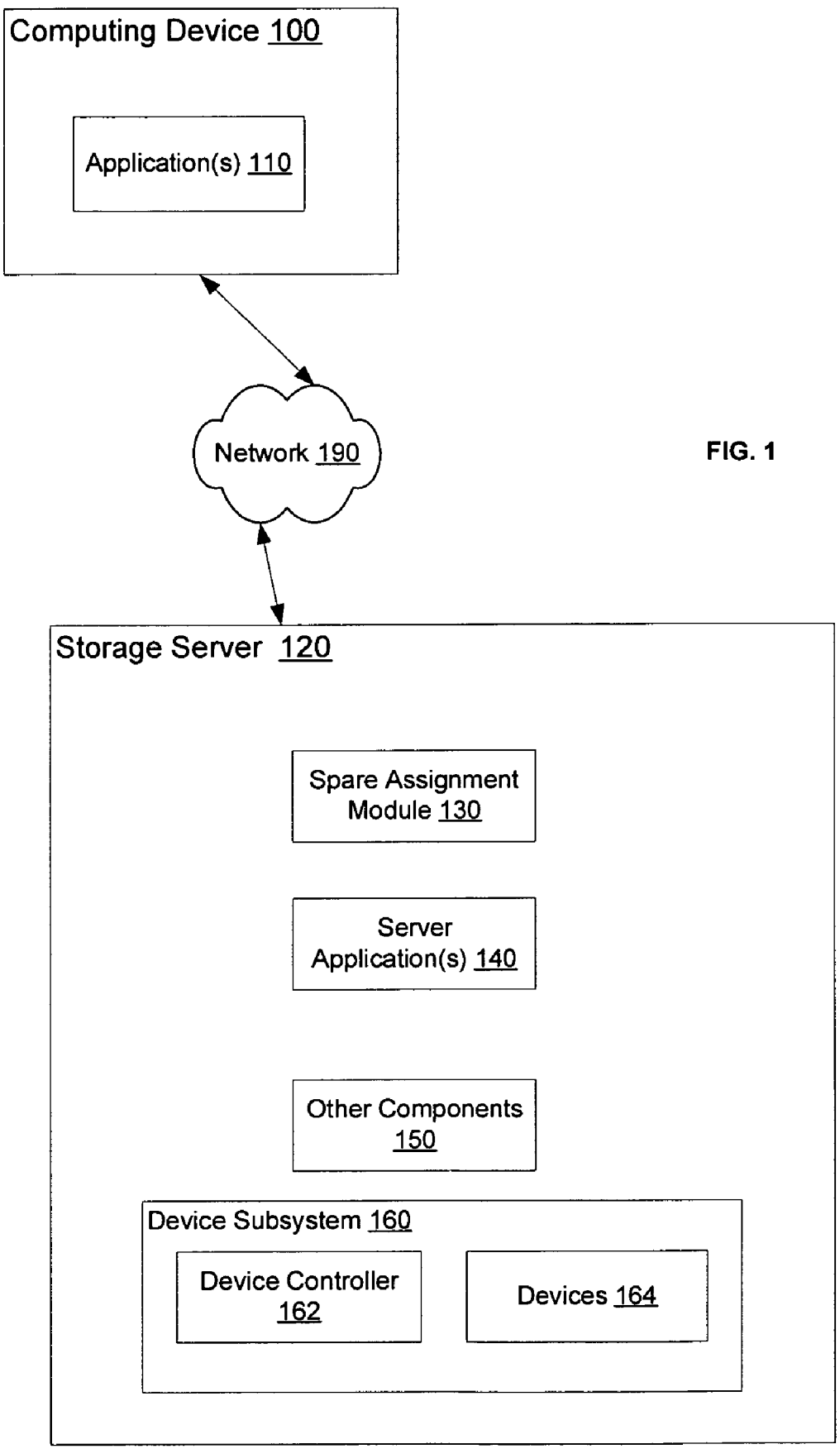
FIG. 1 illustrates details of a computing device in accordance with certain embodiments.

FIG. 1 illustrates details of a computing device in accordance with certain embodiments. A client computer 100 is connected via a network 190 to a storage server 120. The client computer 100 includes one or more applications 110.

The storage server 120 includes a spare assignment module 130 and may include one or more server applications 140 and/or one or more other components. The spare assignment module 130 implements the spare assignment technique for assigning spare devices and also allows users to manually assign spare devices. The storage server 120 provides the client computer 100 with access to data in device subsystem 160. The device subsystem 160 includes a device controller 162 that controls access to one or more device arrays (e.g., a RAID controller that controls access to one or more RAID arrays) and devices 164 (e.g., one or more RAID arrays).

In alternative embodiments, the spare assignment module 130 may be implemented as hardware, software, firmware or some combination of these.

The client computer 100 and storage server 120 may comprise any computing device known in the art, such as a server, mainframe, workstation, personal computer, hand held computer, laptop telephony device, network appliance, etc.

The network 190 may comprise any type of network, such as, for example, a peer-to-peer network, spoke and hub network, Storage Area Network (SAN), a Local Area Network (LAN), Wide Area Network (WAN), the Internet, an Intranet, etc.

Figure 2:
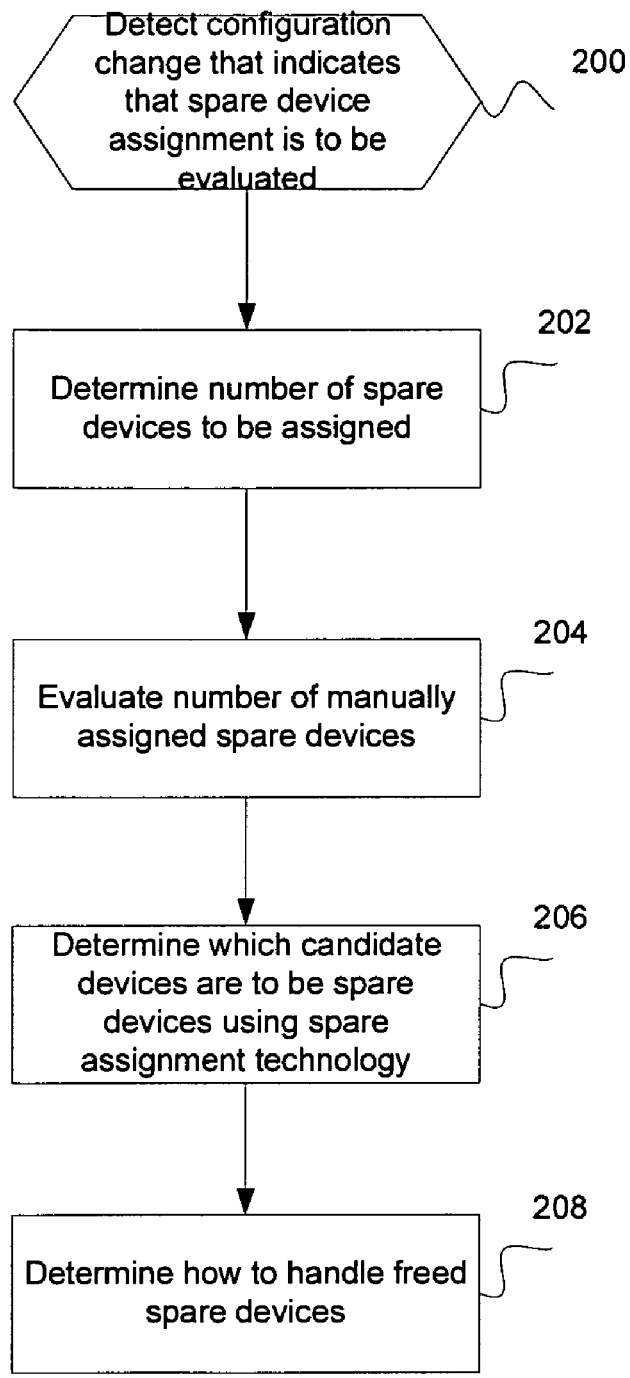
FIG. 2 illustrates logic performed by the spare assignment module in accordance with certain embodiments.

FIG. 2 illustrates logic performed by the spare assignment module 130 in accordance with certain embodiments. Control begins at block 200 with the spare assignment module 130 detecting a configuration change in device subsystem 160 that indicates the spare device assignment is to be evaluated. The spare devices are determined from a set of candidate devices. A candidate device may be described as any storage device in the device subsystem 160 that has not been assigned to a usage or status (such as array member, spare device, rejected, failed, etc.) by a device controller 162 that conflicts with the storage device's capability to be designated or utilized as a global hot spare device. In block 202, the spare assignment module 130 determines a number of spare devices to be assigned, which is further described with respect to FIG. 3. In block 204, the spare assignment module 130 evaluates a number of manually assigned spare devices, which is further described with respect to FIG. 4. In block 206, the spare assignment module 130 determines which candidate devices are to be spare devices using the spare assignment technique (i.e., this is a SAT spare assignment, rather than a manual spare assignment), which is further described with respect to FIGS. 5A, 5B, and 5C. In block 208, the spare assignment module 130 determines how to handle freed spare devices, which is further described with respect to FIG. 6.

Certain embodiments rely on the principle that for a given population of storage devices (C) configured in device arrays of levels that provide redundancy protection for storage device failures, a minimum number of global hot spare storage devices (N) may be determined that provides protection against array failures that cannot be recovered from during a given repair window. Certain embodiments further define the storage device population protected by the global hot spare devices to be a spare coverage group and seek to assign the minimum required number of global hot spare devices for each spare coverage group. The spare coverage group includes the storage devices that are located within the spare coverage domain of each device controller, thus any global hot spare device assigned in a device controller global sparing domain may be used to provide redundancy protection for all device arrays in a domain for which the global hot spare device meets the eligibility criteria. A device controller 162 global sparing domain may be described as a group of storage devices that the device controller 162 may access.

For each device controller 162, there may be a maximum number of D storage devices, which is divided into M spare coverage groups, where the number of storage devices in each spare coverage group is C storage devices. Those skilled in the art will recognize that M times C is less than or equal to D. For example, a last spare coverage group may not be able to be filled (e.g., D=112, C=64, and M=2). Thus, in various embodiments, M*C may not result in strict multiples. For each device controller 162 global sparing domain, there are N spare devices assigned per spare coverage group. The total number of assigned spare devices per device controller 162 global sparing domain is a variable value of 0 to K, where K may be defined by a user or may be set to a default value (e.g., one that is set at time of manufacture of the storage server 120). That is, K may be described as the number of spare devices required for a spare coverage domain. In certain embodiments, the total number of required spare devices (i.e., the value K) is divided into equal parts to provide a number of required spare devices to be provided for each spare coverage group, referred to herein as a number N. A spare coverage group may be described as a storage device population whose characteristics are used as an input to the spare device selection and assignment algorithm.

Figure 3:
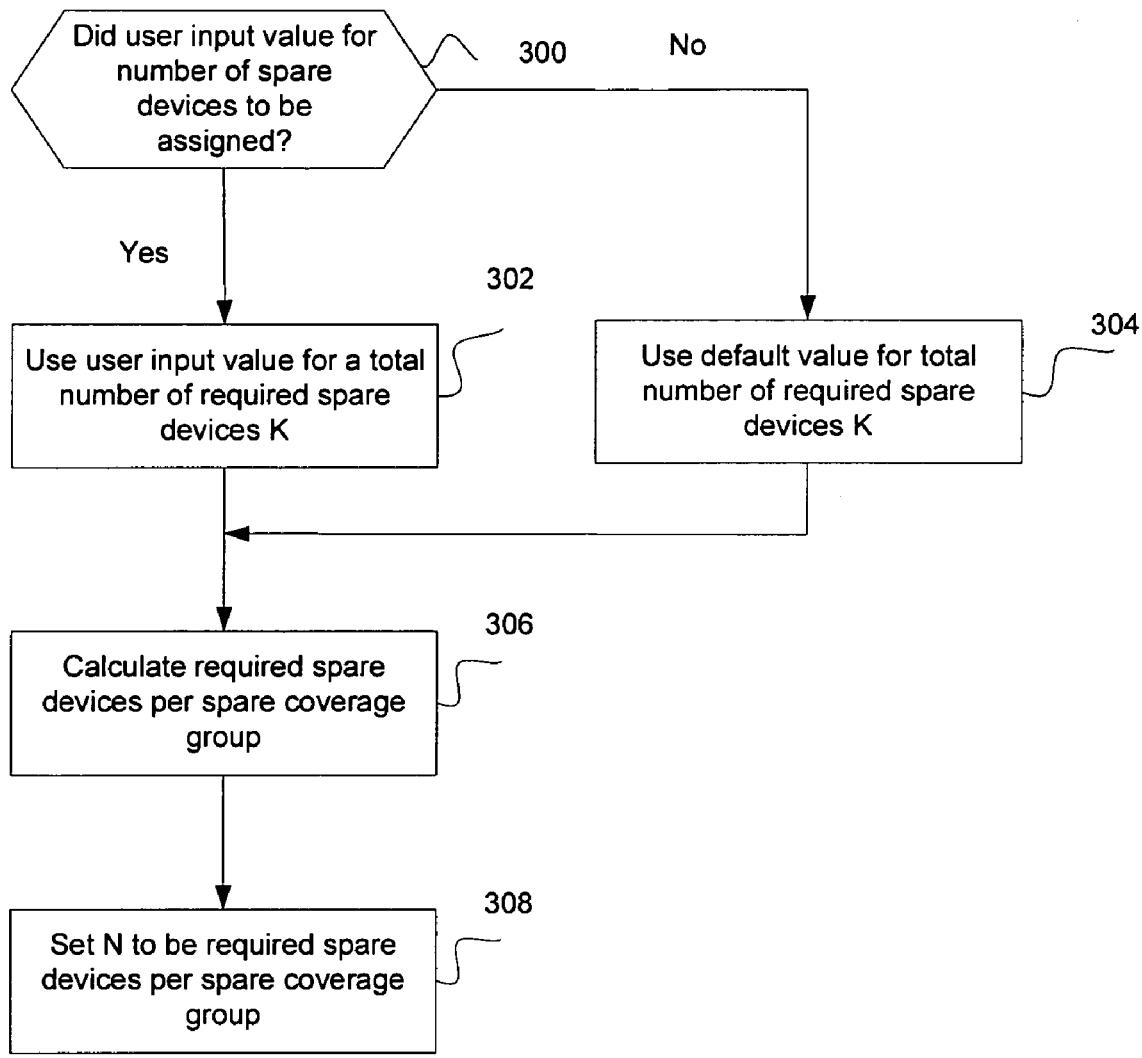
FIG. 3 illustrates logic performed by a spare assignment module for determining a number of spare devices to be assigned in accordance with certain embodiments.

FIG. 3 illustrates logic performed by the spare assignment module 130 for determining a number of spare devices to be assigned in accordance with certain embodiments. Control begins at block 300 with the spare assignment module 130 determining whether a user input a value for the number of spare devices to be assigned. If so, processing continues to block 302, otherwise, processing continues to block 304. In block 302, the spare assignment module 130 uses the user input value as the total number of required spare devices (K). In block 304, the spare assignment module 130 uses a default value as the total number of required spare devices (K). In block 306, the spare assignment module 130 calculates required spare devices for each spare coverage group. In certain embodiments, the spare assignment module 130 performs the calculation using the formula N=K/M, where N is the number of required spare devices per spare coverage group, K is the total number of required spares, M is the number of spare coverage groups, and where K/M is rounded up to a nearest integer. In block 308, the spare assignment module sets N to be the number of calculated required spare devices per spare coverage group.

Figure 4:
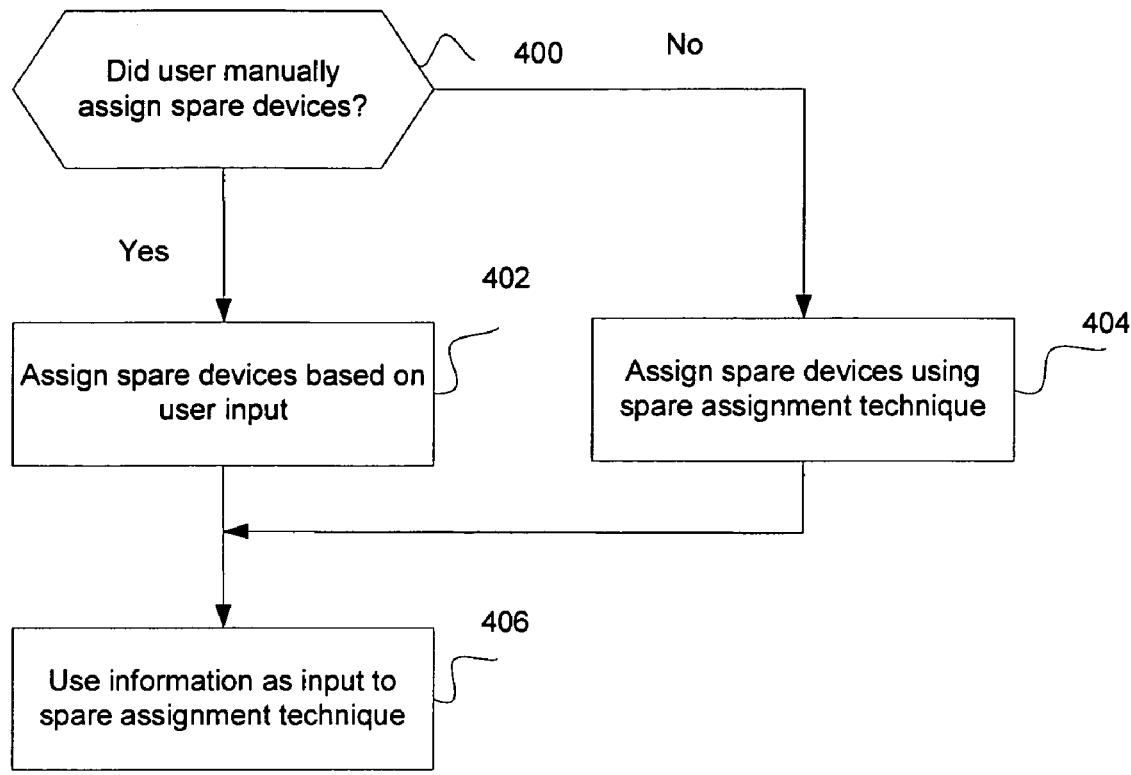
FIG. 4 illustrates logic performed by the spare assignment module for manual assignment of spare devices in accordance with certain embodiments.

FIG. 4 illustrates logic performed by the spare assignment module 130 for manual assignment of spare devices in accordance with certain embodiments. Thus, if users would like to use a deterministic technique of spare assignment, the user is provided the flexibility to manually designate a storage device of a particular type (e.g., a particular capacity and/or speed (i.e., Revolutions Per Minute (RPM)) as a spare device.

In FIG. 4, control begins at block 400 with the spare assignment module 130 determining whether a user manually assigned spare devices. If so, processing continues to block 402, otherwise, processing continues to block 404. In block 402, the spare assignment module 130 assigns spare devices based on the user input. These spare devices are marked to indicate that they have been manually assigned (e.g., marked as permanent spare devices). In block 404, the spare assignment module 130 assigns spare devices using the spare assignment technique. In block 406, the spare assignment module 130 uses information about the assigned spare devices as input to the spare assignment technique.

That is, the spare assignment module 130 allows a user to manually assign spare devices that provide attributes that provide desired operational characteristics should a failure occur in a group of devices of similar characteristics. The manually assigned spare devices are used in addition to SAT assigned spare devices that optimize the management of assignment of spare devices to provide a statistical minimum level of redundancy by automatically assigning spare devices that provide desired characteristics for the entire device system 160 configuration. In certain embodiments, the spare assignment module 130 utilizes the manually assigned spare devices to satisfy the minimum number of spare devices determined by the spare assignment technique as long as the manually assigned spare devices satisfy the characteristics required.

Embodiments provide an enhancement to the spare allocation process to allow a user to specify a particular storage device type (e.g., capacity and/or speed) to be assigned as a spare device. In certain embodiments, the user is presented with options of what storage devices are available to be allocated as spare devices. For example, if a user selects a 146 GigaByte (GB) 15 k (i.e., 15 thousand) RPM device to be configured as a spare device, the manually assigned 146 GB 15 k RPM storage device spare device is used to fulfill the requirements for the minimum number of required spare devices as well. In certain embodiments, the manually assigned spare device state is not allowed to be dynamically transferred between physical storage devices or be freed if other eligible devices are presented (i.e., if 300 GB devices are added and become the spare storage devices determined by the spare assignment technique to fulfill the requirements of the minimum number of required spare devices per device controller 162 global sparing domain). Storage devices that are manually assigned as spare devices are permanently assigned until they are consumed by the device controller 162 for a repair action or the user unassigns these storage devices.

If a user chooses to overallocate spare devices (i.e., assign more spare devices than the minimum required spare devices per device controller 162 global sparing domain), this may be accomplished by manual selection and allocation of spare devices. The user is able to accomplish overallocation of spare devices using the user interface provided by the spare assignment module 130, which may also be used for the manual assignment of spare devices. In certain embodiments, users are allowed to change the manual assignment of spare devices, if the spare device is not assigned to a usage that precludes changing its state from being assigned as a spare and changing the allocation of the device does not result in reducing the number of spare devices below the minimum required spare devices for that device controller 162 global sparing domain. Changing the status of a manually assigned spare device to a free state places the newly freed device in the pool of available devices eligible to participate in the floating spare technique. The floating spare technique allows the automatic freeing of a device from assignment as a spare device when device of more desirable characteristics becomes available to be assigned as a spare using the SAT.

Figure 5A:
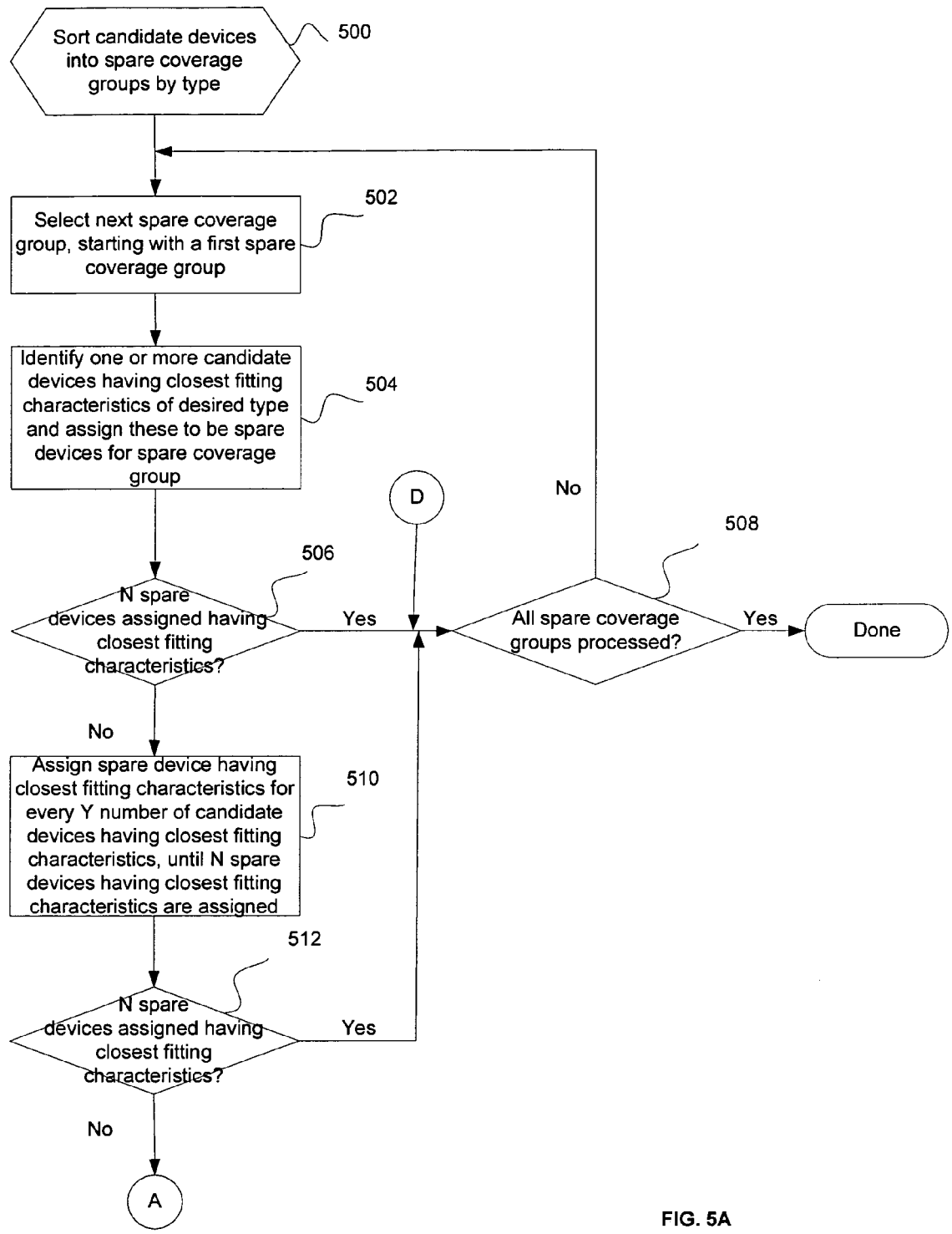
FIGS. 5A, 5B, and 5C illustrate logic performed by the spare assignment module for determining which candidate devices are to be spare devices in each spare coverage group in accordance with certain embodiments.
Figure 5B:
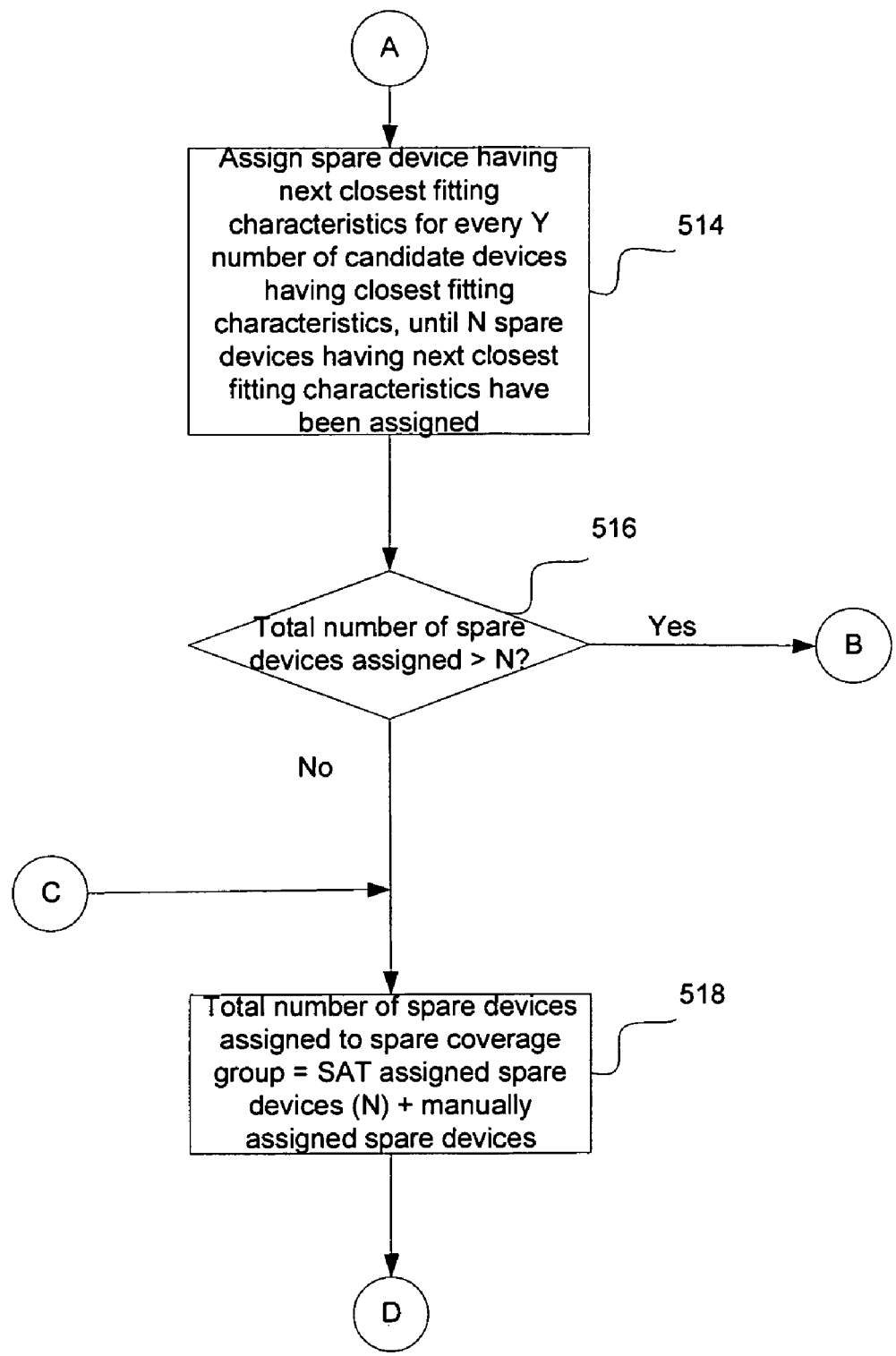
Figure 5C:
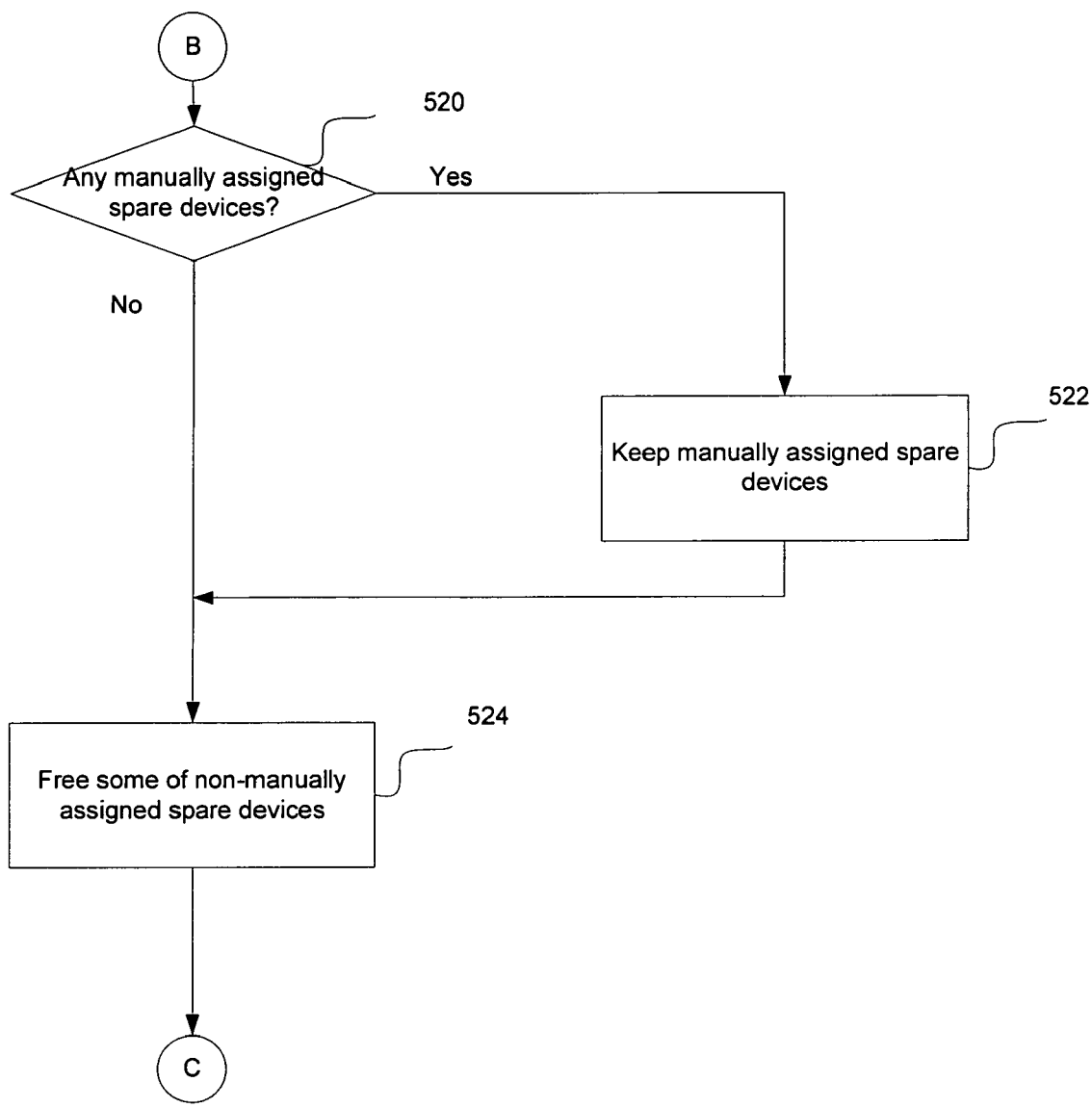

FIGS. 5A, 5B, and 5C illustrate logic performed by the spare assignment module 130 for determining which candidate devices are to be spare devices in each spare coverage group in accordance with certain embodiments. Control begins at block 500 with the spare assignment module 130 sorting candidate devices into spare coverage groups based on type (e.g., capacity). For example, if the storage devices (i.e., a type of candidate device) are sorted based on capacity, the storage devices may be sorted from largest capacity to smallest capacity. In block 502, the spare assignment module 130 selects the next spare coverage group, starting with a first spare coverage group. In block 504, the spare assignment module 130 identifies one or more candidate devices having certain closest fitting characteristics of desired type (e.g., largest capacity X) in the spare coverage group and assigns these candidate devices to be spare devices to provide redundancy protection for the global sparing domain. In block 506, the spare assignment module 130 determines whether N (i.e., a desired number of) spare devices have been assigned having the closest fitting characteristics. If so, processing continues to block 508, otherwise, processing continues to block 510. In block 510, the spare assignment module 130 assigns a spare device having the closest fitting characteristics for every predetermined Y number of candidate devices having the closest fitting characteristics, until N spare devices having the closest fitting characteristics are assigned to the spare coverage group. In certain embodiments, the SAT assigns one spare device for every increment of Y devices. If there is one increment of Y then there will be one spare device, and, if there are greater than Y devices, but less than 2*Y devices, a second spare device is assigned. In certain embodiments Y may be determined as a default for the storage server 120. In block 512, the spare assignment module 130 determines whether N spares having the closest fitting characteristics have been assigned. If so, processing continues to block 508, otherwise, processing continues to block 514 (FIG. 5B). In block 514, the spare assignment module 130 assigns a spare device having the next closest fitting characteristics for every predetermined Y number of candidate devices having the next closest fitting characteristics, until N spare devices are assigned for the spare coverage group. In block 516, the spare assignment module 130 determines whether the total number of spare devices assigned to the spare coverage group is greater than N. The number of spare devices assigned may be greater than N if some spare devices have already been manually assigned. If so, processing continues to block 520 (FIG. 5C), otherwise, processing continues to block 518.

Thus, with the processing of blocks 504-514, one or more candidate devices having closest fitting desired characteristics are assigned to be spare devices and then a spare device having closest fitting desired characteristics for every predetermined number of candidate devices having the closest fitting desired characteristics is assigned until at least a desired number of spare devices have been assigned to a spare coverage group.

In block 518, the spare assignment module 130 sets the total number of spare devices assigned to the spare coverage group to be the SAT assigned spares (N) plus the manually assigned spares. From block 518, processing continues to block 508.

In block 520, the spare assignment module 130 determines whether there are any manually assigned spare devices for the spare coverage group. If so, processing continues to block 522, otherwise, processing continues to block 524. In block 522, the spare assignment module 130 keeps the manually assigned spare devices. In block 524, the spare assignment module 130 frees some of the non-manually assigned spare devices so that the number of assigned spare devices is N. From block 524, processing continues to block 518 (FIG. 5B).

In block 508, the spare assignment module 130 determines whether all spare coverage groups have been processed. If so, processing is done, otherwise processing loops back to block 502 to select the next spare coverage group.

Merely for illustration, an example is provided herein in which a characteristic of capacity is used to assign spare devices to spare coverage groups. In particular, the largest capacity spare devices are assigned to a first spare coverage group, and the next largest capacity spare devices are assigned to a second spare coverage group.

In particular, embodiments provide an incremental number of spare devices as the configuration of the device controller 162 global sparing domain grows beyond a first predetermined number of storage devices (i.e., the size of a spare coverage group, such as forty-eight (48) storage devices).

Beyond the first predetermined number of storage devices, the spare assignment module 130 incrementally allocates an additional number of spare devices per device controller 162 global sparing domain. The maximum number of minimum required spare devices for each device controller 162 global sparing domain will be referred to herein as K. To optimize the number of spare devices that are assigned using the spare assignment technique, the spare assignment module 130 uses the following rules:

1. The total number of storage devices per device controller 162 global sparing domain (96 in this example) is divided into two (2) spare coverage groups, and the spare coverage groups are sorted by storage device type, which is by storage device capacity in this example.
   a. Spare coverage groups are dynamic lists that are sorted each time the configuration changes and it is necessary to analyze spare devices for fulfillment of the spare device policy.
   b. Group 1 spare coverage group
      i. Group 1 may have from 1-48 storage devices
      ii. Group 1 contains the 48 largest capacity storage devices on the device controller 162 global sparing domain
   c. Group 2 spare coverage group
      i. Group 2 may have from 0-48 storage devices
      ii. Group 2 contains whichever storage devices remain after Group 1 has 48 storage devices
2. Fulfillment of the requirement for the minimum number of required spare devices per device controller global sparing domain are evaluated as follows:
   a. The minimum number of required spare devices for spare coverage Group 1 is N. There are N required spare devices of the eligible storage device type on a device controller 162 global sparing domain and these are used to meet the requirements of spare coverage Group 1.
      i. Spare devices are assigned for the eligible storage device type on a device controller 162 global sparing domain until there are N eligible spare devices.
         1) One spare device is assigned from each increment of eight (8) storage devices of the eligible storage device type populated on a device controller 162 global sparing domain until there are N spare devices assigned. For example, if there are 1-48 storage devices, then one spare device is assigned from the first set of storage devices numbered 1-8, one spare device is assigned from the next set of storage devices numbered 9-16, etc.
         2) If there are less than N increments of 8 storage devices of the eligible spare type, spare devices are assigned from the next best candidates until there are N spare devices assigned.
            a) The next best available candidates may be described as the spare devices that are eligible to provide a spare device for the most storage devices of the spare coverage group (e.g., for capacity only based rules, if 300 Gigabytes (GB) is the storage device type that would provide the best coverage, but there are less than N groups of 300 GB storage devices, then the next best candidate would be a 146 GB storage device versus a 73 GB spare device)
   b. If spare coverage Group 2 has greater than zero members, then there are N required spare devices for spare coverage Group 2.
      i. Eligible spare devices are assigned to meet the requirements for the largest capacity storage devices in spare coverage Group 2, on a device controller 162 global sparing domain until there are N eligible spare devices.
         1) One spare device is assigned from each increment of eight (8) storage devices of the eligible storage device type populated on a device controller 162 global sparing domain until there are N spare devices assigned. For example, if there are storage devices 49-96 in this spare coverage group, then one spare device is assigned from the first set of storage devices numbered 49-56, one spare device is assigned from the next set of storage devices numbered 57-64, etc.
         2) If there are less than N increments of 8 storage devices of the eligible spare type, spare devices are assigned from the next best candidates until there are N spare devices assigned.
            a) The next best available candidates may be described as the candidates that are eligible to provide a spare device for the most members of the spare coverage group (i.e., for capacity only based rules, if 300 GB is the storage device type that would provide the best coverage, but there are less than N groups of 300 GB storage devices, then the next best candidate would be a 146 GB storage device versus a 73 GB spare device).

Figure 6:
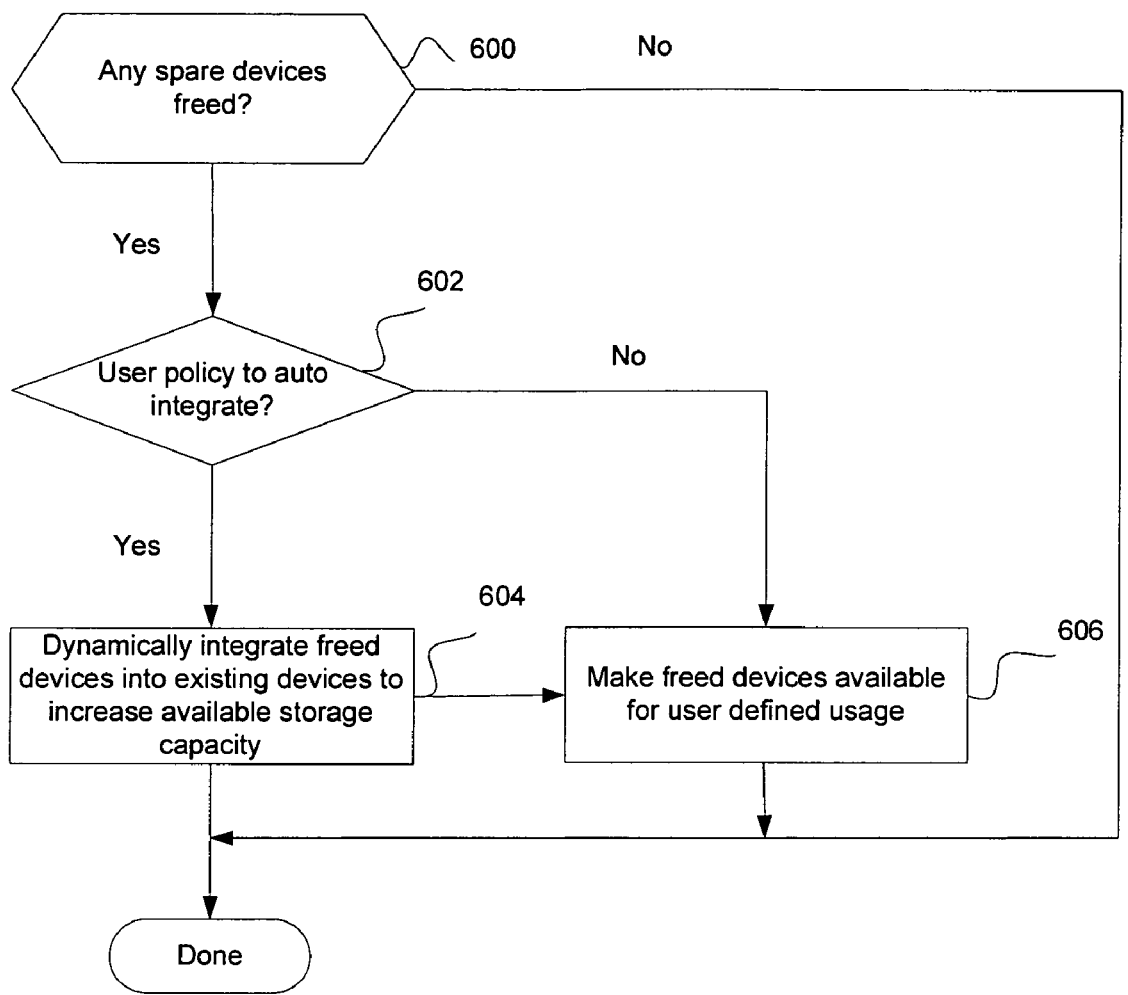
FIG. 6 illustrates logic performed by the spare assignment module for handling freed spare devices in accordance with certain embodiments.

FIG. 6 illustrates logic performed by the spare assignment module 130 for handling freed spare devices in accordance with certain embodiments. Control begins at block 600 with the spare assignment module 130 determining whether any spare devices have been freed. If so, processing continues to block 602, otherwise, processing is done. In block 602, the spare assignment module 130 determines whether there is a user policy to auto integrate the freed devices with existing device arrays of a compatible storage device type 164. If so, processing continues to block 604, otherwise, processing continues to block 606. In block 604, the spare assignment module 130 dynamically integrates the freed devices into existing device arrays to increase available storage capacity. In block 606, the spare assignment module 130 makes the freed devices available for user defined usage.

A user defined policy for auto integration of freed former spare devices allows the spare assignment module 130 to autonomically increase the available user storage capacity by automatically integrating the freed devices into, for example, an existing device array, increasing the capacity of available storage for user data.

Figure 7:
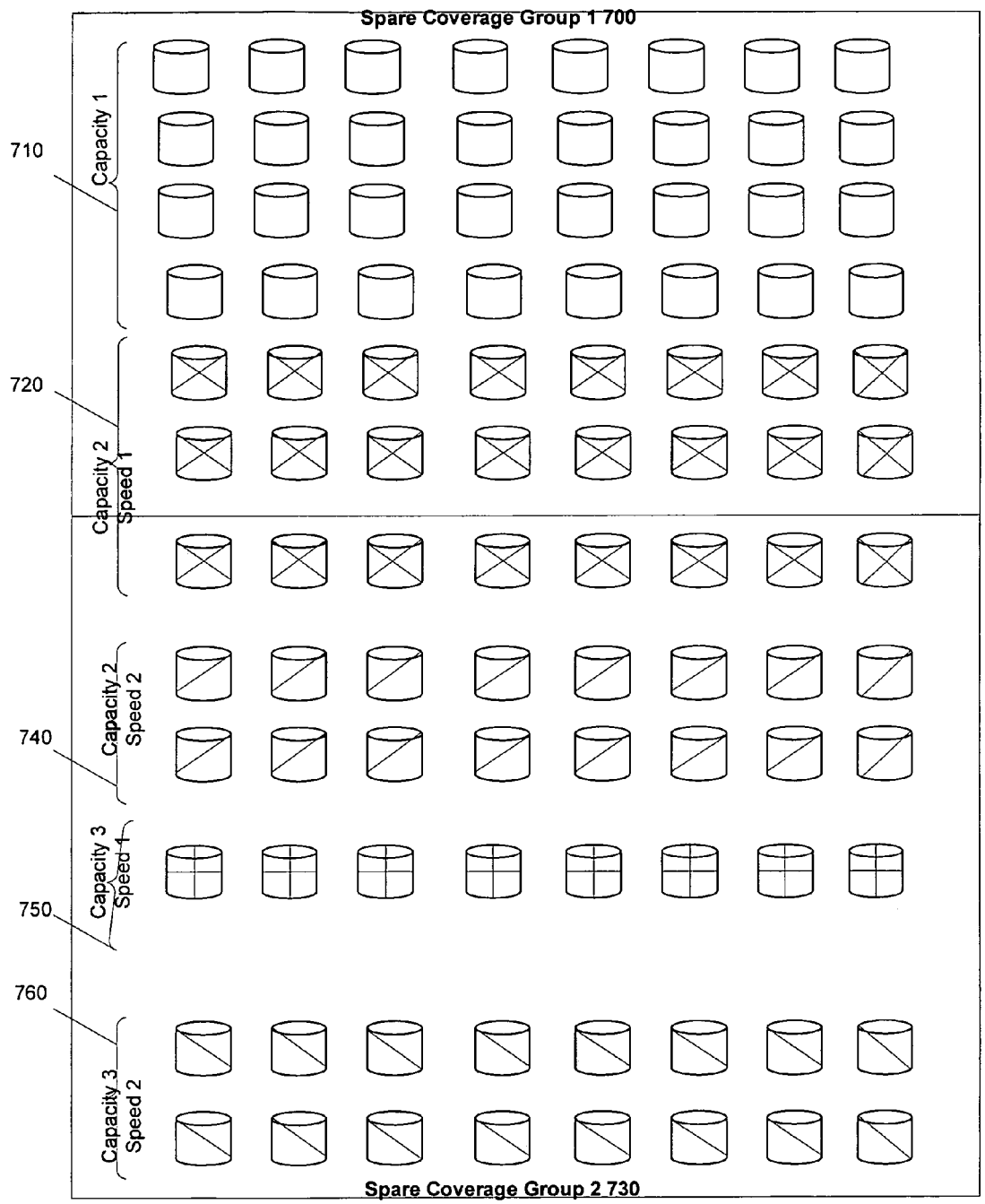
FIG. 7 illustrates an example of spare device allocation in accordance with certain embodiments.

FIG. 7 illustrates an example of spare device allocation in accordance with certain embodiments. In FIG. 7, ninety-six (96) storage devices of three different capacities 1, 2, and 3, where capacity 1>capacity 2>capacity 3, are separated into two (2) spare coverage groups 700, 730. The first spare coverage group 700 includes 48 spare devices (e.g., numbered 1-48), while the second spare coverage group 130 includes 48 storage devices (e.g., numbered 49-96). Using the spare assignment technique, the spare assignment module 130 determines that N spare devices of capacity 1 are required to be allocated based on the storage device characteristics of spare coverage group 1 700. The spare assignment module 130 also determines that N spare devices of capacity 2 be allocated based on the storage device characteristics of spare coverage group 2 730. In FIG. 7, storage devices 710 of capacity 1 have a same speed, while storage devices of capacity 2 and capacity 3 also have two different speeds, speed 1 and speed 2. For example, there are: storage devices 720 of capacity 2, speed 1; storage devices 740 of capacity 2, speed 2; storage devices 750 of capacity 3 speed 1; and storage devices 760 of capacity 3, speed 2. Storage devices of equal capacities that operate at different speeds may have different performance characteristics. In certain embodiments, the spare assignment module 130 implements an optimization technique that uses capacity as well as other characteristics, such as speed, to assign spare devices to spare coverage groups.

In cases in which users intermix storage device types, the user may choose to ensure that there are spare devices available to assign to spare coverage groups that have a failure to ensure that the performance impacts are minimized. In those cases, users may override the assignment of spare devices based on capacity and manually assign spare devices that meet desired performance characteristics. In the example of FIG. 7, a capacity based spare assignment technique chooses devices of capacity 2 to provide spare storage devices for spare coverage group 2. In this case, to ensure that the performance characteristics desired are maintained, the user may choose to assign J spare devices of storage device Type capacity 2 speed 2 to provide redundancy and spare coverage for the 16 storage devices of that type. A user may also decide to assign H spare devices of storage device Type capacity 3 speed 2 to provide redundancy and spare coverage for the 16 storage devices of that type. In this example, J and H are integers that assign spare devices in the numbers desired to provide the redundancy that the user wishes to provide.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description; a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, 4, 5A, 5B, 5C, and 6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, 4, 5A, 5B, 5C, and 6 may be implemented in software, hardware, programmable and non-programmable gate array logic or in some combination of hardware, software, or gate array logic.

Figure 8:
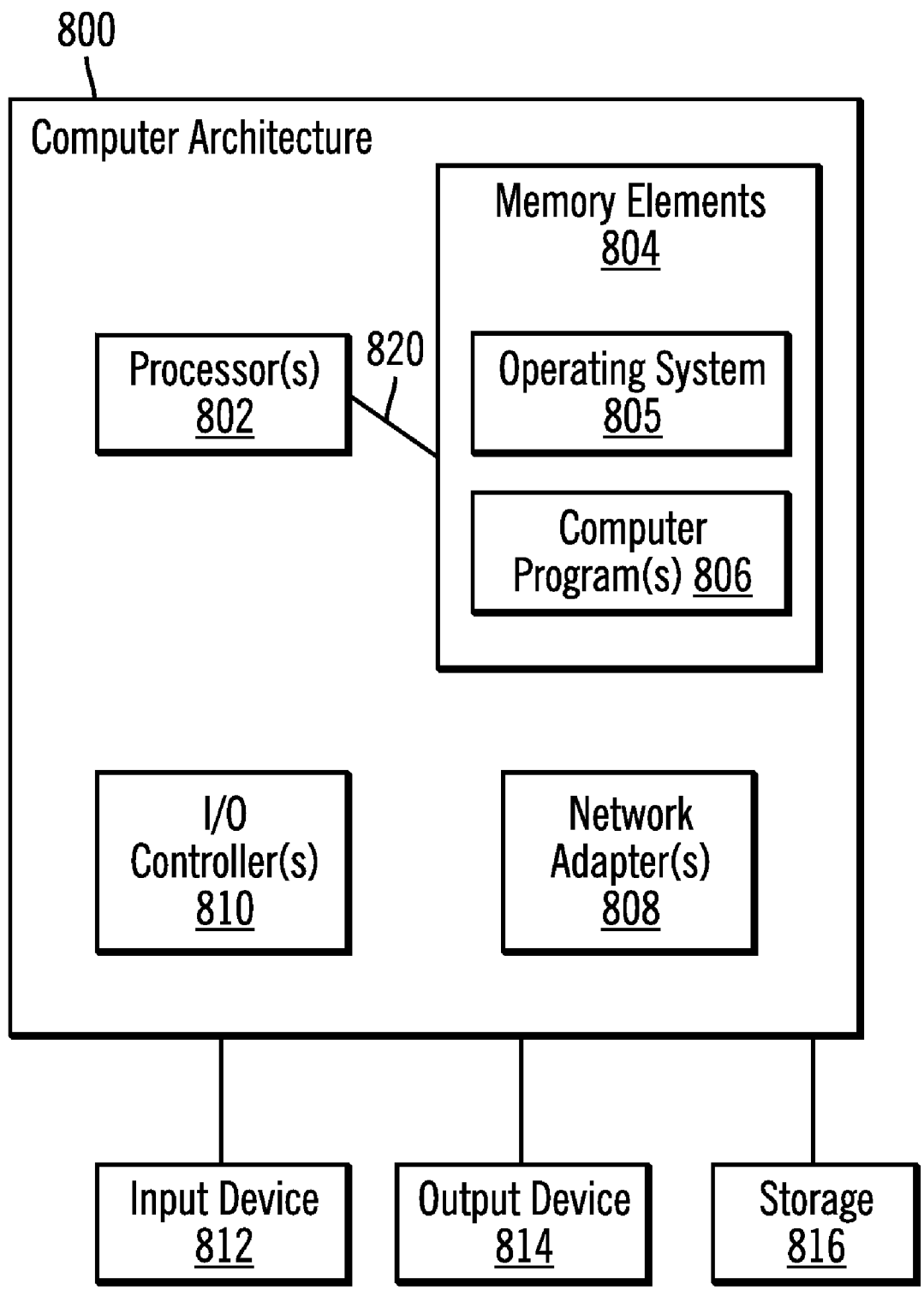
FIG. 8 illustrates an architecture of a computer system that may be used in accordance with certain embodiments.

FIG. 8 illustrates a system architecture 800 that may be used in accordance with certain embodiments. Client computer 100 and/or server computer 120 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for spare device management, comprising:
    sorting candidate devices into spare coverage groups by type;
    for each spare coverage group, determining which of the candidate devices in the spare coverage group are to be spare devices by:
        identifying one or more candidate devices having closest fitting characteristics of a desired type from the spare coverage groups;
        assigning the identified one or more candidate devices to be spare devices for the spare coverage group;
        determining whether a desired number of spare devices have been assigned to the spare coverage group; and
        in response to determining that the desired number of spare devices have not been assigned to the spare coverage group,
            assigning multiple additional spare devices by assigning one spare device having the closest fitting characteristics from each group formed by an increment of a predetermined number of candidate devices having the closest fitting characteristics; and
            assigning multiple additional spare devices by assigning a spare device having next closest fitting characteristics for every predetermined number of candidate devices having the next closest fitting characteristics, wherein the closest fitting characteristics are different from the next closest fitting characteristics, and wherein the spare coverage group includes devices having the closest fitting characteristics and the next closest fitting characteristics.

2. The method of claim 1, further comprising:
    in response to assigning the spare device having the closest fitting characteristics for every predetermined number of candidate devices having the closest fitting characteristics, determining whether the desired number of spare devices have been assigned to the spare coverage group.

3. The method of claim 1, further comprising:
    determining that a total number of spare devices assigned to the spare coverage group is greater than a desired number of spare devices for the spare coverage group;
    determining whether there are any manually assigned spare devices for the spare coverage group; and
    in response to determining that there are any manually assigned spare devices,
        keeping the manually assigned spare devices; and
        freeing some of the spare devices that were not manually assigned until the total number of spare devices assigned to the spare coverage group is the desired number of spare devices for the spare coverage group.

4. The method of claim 1, further comprising:
    determining whether a user input a value for a number of spare devices to be assigned;
    in response to determining that the user input the number, using that number as a total number of spare devices to be assigned;
    in response to determining that the user did not input the number, using a default number as the total number of spare devices to be assigned; and
    determining the desired number of spare devices to be assigned per spare coverage group by dividing the total number of spare devices to be assigned by a total number of spare coverage groups and rounding up to a nearest integer.

5. The method of claim 1, further comprising:
    determining whether a user manually assigned spare devices; and
    in response to determining that the user manually assigned spare devices, assigning the spare devices based on the manual assignment.

6. The method of claim 1, further comprising:
    determining whether any spare devices have been freed;
    in response to determining that at least one spare device has been freed,
        determining whether there is a user policy to auto integrate;
        in response to determining that there is a user policy to auto integrate, dynamically integrating freed devices into existing devices to increase available storage capacity; and
        making the freed devices available for user defined usage.

7. The method of claim 6, further comprising:
    in response to determining that there is no user policy to auto integrate, making the freed devices available for user defined usage.

8. A computer-implemented method for spare device management, comprising:
    determining which of the candidate devices in the spare coverage group are to be spare devices by:
        assigning multiple spare devices by assigning one spare device having closest fitting desired characteristics from each group formed by an increment of a predetermined number of candidate devices having the closest fitting desired characteristics;

in response to determining that the desired number of spare devices have not been assigned, assigning multiple additional spare devices by assigning a spare device having next closest fitting characteristics for every predetermined number of candidate devices having the next closest fitting characteristics, wherein the closest fitting characteristics are different from the next closest fitting characteristics, and wherein the spare coverage group includes devices having the closest fitting characteristics and the next closest fitting characteristics;

determining that a total number of spare devices assigned to the spare coverage group is greater than a desired number of spare devices for the spare coverage group;

determining whether there are any manually assigned spare devices; and in response to determining that there are manually assigned spare devices, keeping the manually assigned spare devices; and freeing some of the spare devices that were not manually assigned until the total number of spare devices assigned to the spare coverage group is the desired number of spare devices for the spare coverage group.

9. The method of claim 8, wherein the assignment occurs in response to detecting a configuration change that indicates that spare device assignment is to be evaluated, wherein the configuration change causes evaluation of the spare device assignment regarding either a new device type or an additional device to be assigned to meet a minimum desired level of redundancy.

10. A computer program product for spare device management, comprising a computer readable storage medium including a computer readable program, wherein the computer readable program when executed by a processor on a computer causes the computer to:

sort candidate devices into spare coverage groups by type;

for each spare coverage group, determining which of the candidate devices in the spare coverage group are to be spare devices by:

identify one or more candidate devices having closest fining characteristics of a desired type from the spare coverage groups;

assign the identified one or more candidate devices to be spare devices for the spare coverage group;

determine whether a desired number of spare devices have been assigned to the spare coverage group; and in response to determining that the desired number of spare devices have not been assigned to the spare coverage group, assign multiple additional spare devices by assigning one spare device having the closest fitting characteristics from each group formed by an increment of a predetermined number of candidate devices having the closest fitting characteristics; and assign multiple additional spare devices by assigning a spare device having next closest fitting characteristics for every predetermined number of candidate devices having the next closest fitting characteristics, wherein the closest fitting characteristics are different from the next closest fitting characteristics, and wherein the spare coverage group includes devices having the closest fitting characteristics and the next closest fitting characteristics.

11. The computer program product of claim 10, wherein the computer readable program when executed on a computer causes the computer to:

in response to assigning the spare device having the closest fitting characteristics for every predetermined number of candidate devices having the closest fitting characteristics, determine whether the desired number of spare devices have been assigned to the spare coverage group.

12. The computer program product of claim 10, wherein the computer readable program when executed on a computer causes the computer to:

determine that a total number of spare devices assigned to the spare coverage group is greater than a desired number of spare devices for the spare coverage group;

determine whether there are any manually assigned spare devices for the spare coverage group; and in response to determining that there are any manually assigned spare devices, keep the manually assigned spare devices; and free some of the spare devices that were not manually assigned until the total number of spare devices assigned to the spare coverage group is the desired number of spare devices for the spare coverage group.

13. The computer program product of claim 10, wherein the computer readable program when executed on a computer causes the computer to:

determine whether a user input a value for a number of spare devices to be assigned;

in response to determining that the user input the number, use that number as a total number of spare devices to be assigned;

in response to determining that the user did not input the number, use a default number as the total number of spare devices to be assigned; and determine the desired number of spare devices to be assigned per spare coverage group by dividing the total number of spare devices to be assigned by a total number of spare coverage groups and rounding up to a nearest integer.

14. The computer program product of claim 10, wherein the computer readable program when executed on a computer causes the computer to:

determine whether a user manually assigned spare devices; and in response to determining that the user manually assigned spare devices, assign the spare devices based on the manual assignment.

15. The computer program product of claim 10, wherein the computer readable program when executed on a computer causes the computer to:

determine whether any spare devices have been freed;

in response to determining that at least one spare device has been freed, determine whether there is a user policy to auto integrate;

in response to determining that there is a user policy to auto integrate, dynamically integrate freed devices into existing devices to increase available storage capacity; and make the freed devices available for user defined usage.

16. The computer program product of claim 15, wherein the computer readable program when executed on a computer causes the computer to:

in response to determining that there is no user policy to auto integrate, make the freed devices available for user defined usage.

17. A system for spare device management, comprising:
hardware logic capable of performing operations, the operations comprising:
sorting candidate devices into spare coverage groups by type;
for each spare coverage group, determining which of the candidate devices in the spare coverage group are to be spare devices by:
identifying one or more candidate devices having closest fitting characteristics of a desired type from the spare coverage groups;
assigning the identified one or more candidate devices to be spare devices for the spare coverage group;
determining whether a desired number of spare devices have been assigned to the spare coverage group; and
in response to determining that the desired number of spare devices have not been assigned to the spare coverage group,
assigning multiple additional spare devices by assigning one spare device having the closest fitting characteristics from each group formed by an increment of a predetermined number of candidate devices having the closest fitting characteristics; and
assigning multiple additional spare devices by assigning a spare device having next closest fitting characteristics for every predetermined number of candidate devices having the next closest fitting characteristics, wherein the closest fitting characteristics are different from the next closest fitting characteristics, and wherein the spare coverage group includes devices having the closest fitting characteristics and the next closest fitting characteristics.

18. The system of claim 17, wherein the operations further comprise:
in response to assigning the spare device having the closest fitting characteristics for every predetermined number of candidate devices having the closest fitting characteristics, determining whether the desired number of spare devices have been assigned to the spare coverage group.

19. The system of claim 17, wherein the operations further comprise:
determining that a total number of spare devices assigned to the spare coverage group is greater than a desired number of spare devices for the spare coverage group;
determining whether there are any manually assigned spare devices for the spare coverage group; and
in response to determining that there are any manually assigned spare devices,
keeping the manually assigned spare devices; and
freeing some of the spare devices that were not manually assigned until the total number of spare devices assigned to the spare coverage group is the desired number of spare devices for the spare coverage group.

20. The system of claim 17, wherein the operations further comprise:
determining whether a user input a value for a number of spare devices to be assigned;
in response to determining that the user input the number, using that number as a total number of spare devices to be assigned;
in response to determining that the user did not input the number, using a default number as the total number of spare devices to be assigned; and
determining the desired number of spare devices to be assigned per spare coverage group by dividing the total number of spare devices to be assigned by a total number of spare coverage groups and rounding up to a nearest integer.

21. The system of claim 17, wherein the operations further comprise:
determining whether a user manually assigned spare devices; and
in response to determining that the user manually assigned spare devices, assigning the spare devices based on the manual assignment.

22. The system of claim 17, wherein the operations further comprise:
determining whether any spare devices have been freed;
in response to determining that at least one spare device has been freed,
determining whether there is a user policy to auto integrate;
in response to determining that there is a user policy to auto integrate, dynamically integrating freed devices into existing devices to increase available storage capacity; and
making the freed devices available for user defined usage.

23. The system of claim 22, wherein the operations further comprise:
in response to determining that there is no user policy to auto integrate, making the freed devices available for user defined usage.

24. A computer program product for spare device management, comprising a computer readable storage medium including a computer readable program, wherein the computer readable program when executed by a processor on a computer causes the computer to:
in response to detecting a configuration change that indicates that spare device assignment is to be evaluated, wherein the configuration change causes evaluation of the spare device assignment regarding either a new device type or an additional device to be assigned to meet a minimum desired level of redundancy:
assign one spare device having closest fitting desired characteristics from each group formed by an increment of a predetermined number of candidate devices having the closest fitting desired characteristics;
in response to determining that the desired number of spare devices have not been assigned, assign a spare device having next closest fitting characteristics for every predetermined number of candidate devices having the next closest fitting characteristics having the closest fitting characteristics because there are less than the desired number of increments of the predetermined number of candidate devices having the closest fitting characteristics;
determine that a total number of spare devices assigned to the spare coverage group is greater than a desired number of spare devices for the spare coverage group;
determine whether there are any manually assigned spare devices; and
in response to determining that there are manually assigned spare devices,
keep the manually assigned spare devices; and
free some of the spare devices that were not manually assigned until the total number of spare devices assigned to the spare coverage group is the desired number of spare devices for the spare coverage group.

25. The computer program product of claim 24, wherein the assignment occurs in response to detecting a configuration change that indicates that spare device assignment is to be evaluated, wherein the configuration change causes evaluation of the spare device assignment regarding either a new device type or an additional device to be assigned to meet a minimum desired level of redundancy.

26. A system for spare device management, comprising:
hardware logic capable of performing operations, the operations comprising:
in response to detecting a configuration change that indicates that spare device assignment is to be evaluated, wherein the configuration change causes evaluation of the spare device assignment regarding either a new device type or an additional device to be assigned to meet a minimum desired level of redundancy:
assigning one spare device having closest fitting desired characteristics from each group formed by an increment of a predetermined number of candidate devices having the closest fitting desired characteristics;
in response to determining that the desired number of spare devices have not been assigned, assigning a spare device having next closest fitting characteristics for every predetermined number of candidate devices having the next closest fitting characteristics having the closest fitting characteristics because there are less than the desired number of increments of the predetermined number of candidate devices having the closest fitting characteristics;
determining that a total number of spare devices assigned to the spare coverage group is greater than a desired number of spare devices for the spare coverage group;
determining whether there are any manually assigned spare devices; and
in response to determining that there are manually assigned spare devices,
keeping the manually assigned spare devices; and
freeing some of the spare devices that were not manually assigned until the total number of spare devices assigned to the spare coverage group is the desired number of spare devices for the spare coverage group.

27. The system of claim 26, wherein the assignment occurs in response to detecting a configuration change that indicates that spare device assignment is to be evaluated, wherein the configuration change causes evaluation of the spare device assignment regarding either a new device type or an additional device to be assigned to meet a minimum desired level of redundancy.

* * * * *